Patented Dec. 2, 1952

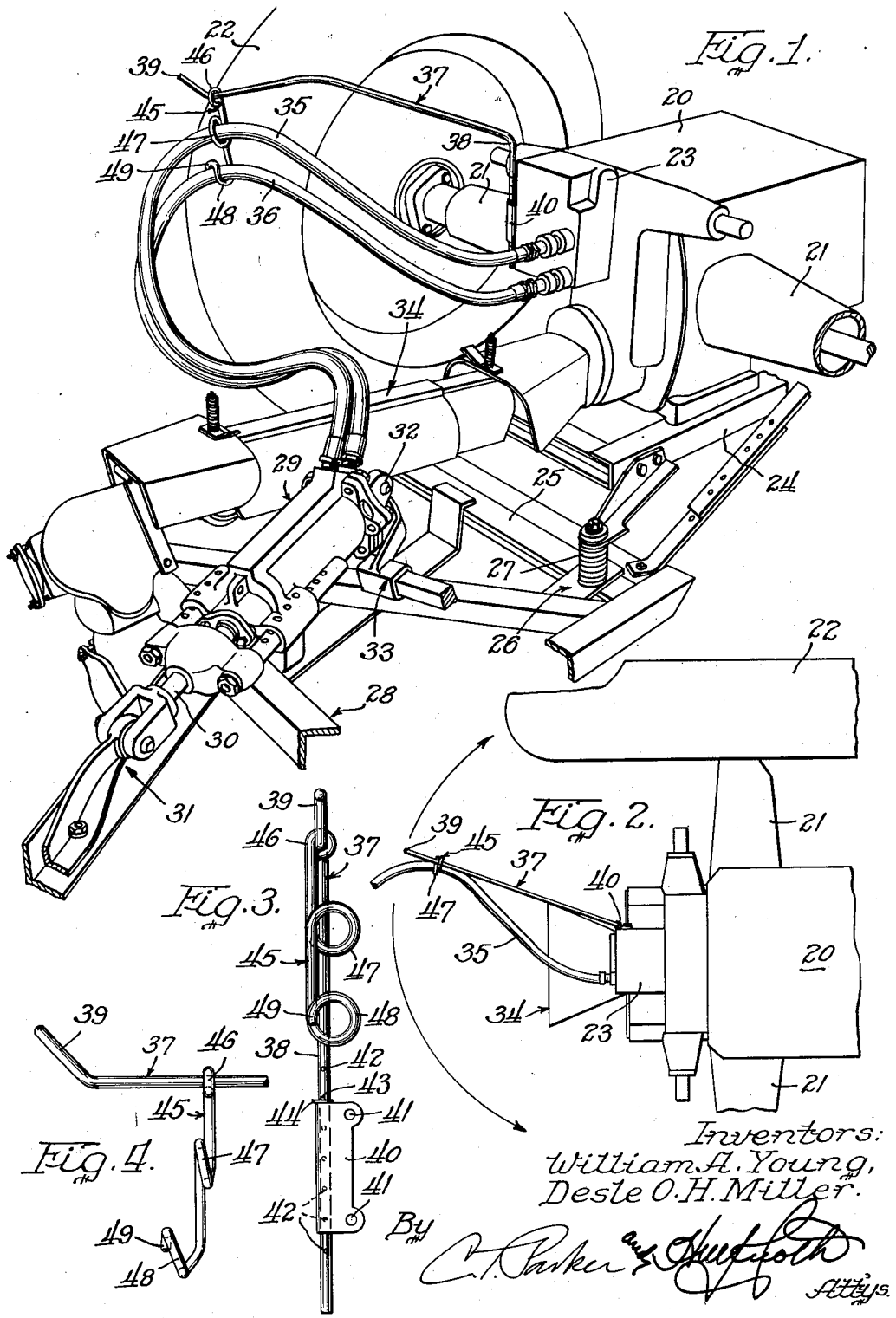

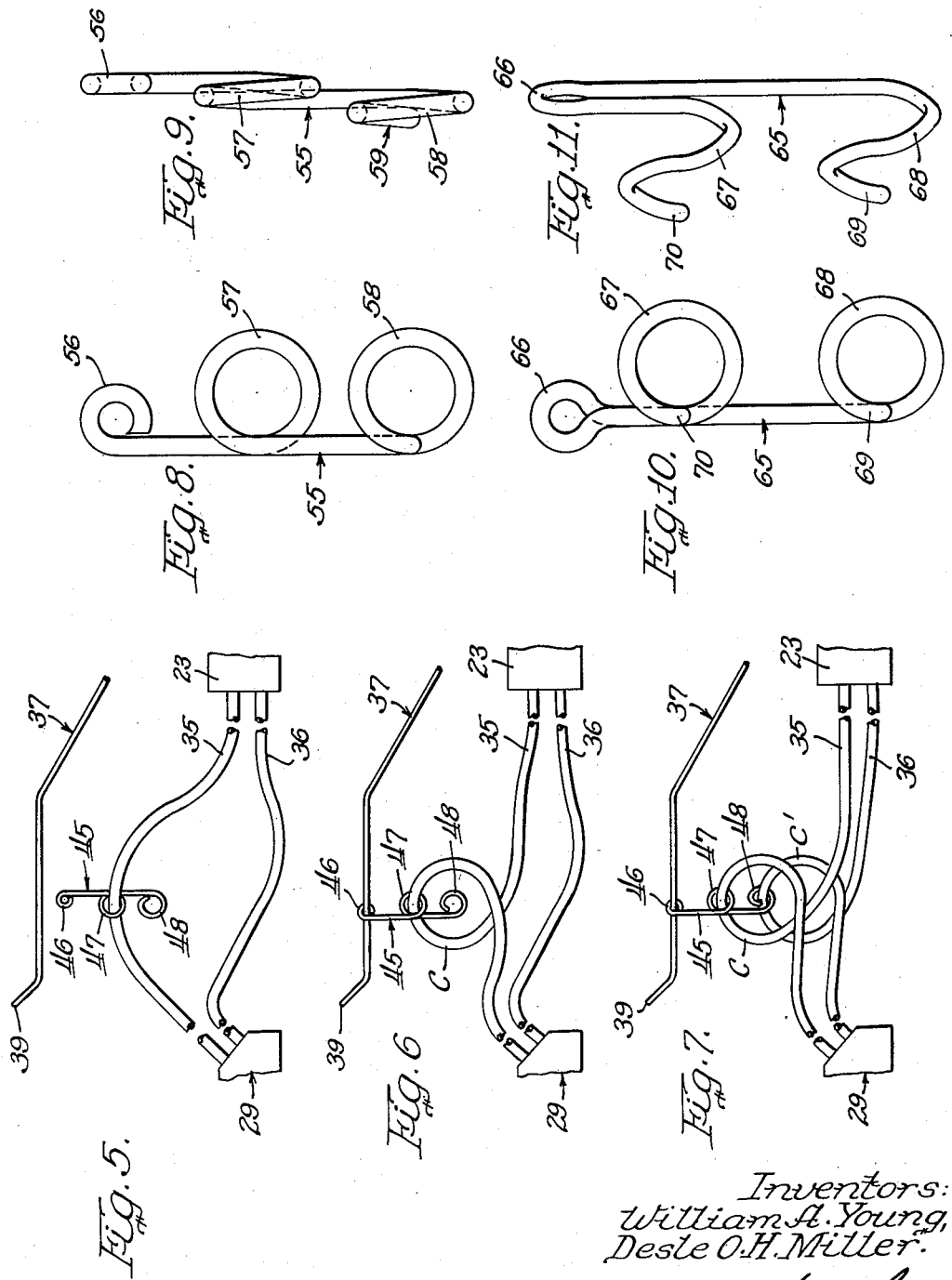

2,619,888

UNITED STATES PATENT OFFICE 2,619,888

SUPPORTING MEANS FOR FLEXIBLE CONDUITS IN HYDRAULIC CONTROL MEANS

William A. Young, Rock Island, and Desle O. H. Miller, East Moline, Ill., assignors to Deere & Company, Moline, Ill., a corporation of Illinois Application February 6, 1948, Serial No. 6,763

15 Claims. (Cl. 97—50)

This invention relates to improvements in hydraulic control systems and more particularly to means for supporting the flexible fluid-transmitting conduit used between a source of pressure and a remote fluid motor.

The principal field to which the invention is applicable is that involving the use of tractor-propelled or tractor-mounted implements. In a typical arrangement in this field, the tractor is equipped with means for supplying fluid under pressure to a fluid motor located on an implement either carried by or otherwise connected to the tractor to be propelled thereby. The fluid motor is carried on the implement and is utilized to operate or move a movable part of the implement to accomplish adjustment thereof. It is characteristic of tractor-drawn implements that the fluid motor on the implement is located at a point relatively remote from the source of fluid pressure on the tractor and relatively long hoses or equivalent flexible fluid conduits must be utilized between the pressure source and the fluid motor. Inasmuch as there is considerable relative movement between the tractor and implement and because of the conditions under which the tractor and implement operate, there is considerable likelihood that the hoses will be damaged if not properly supported between the tractor and implement.

The problem in this respect has become more acute with the development of the proposition that the same fluid motor may be used in connection with various types of implements, in which cases the distances between the fluid motor and the source of pressure will vary to a great extent. Also, in these cases it is desirable to provide an arrangement in which is is not necessary to use hoses of different lengths each time the fluid motor is changed from one implement to another. It is desirable, therefore, to standardize on a relatively few sizes of hoses to accommodate as many situations as possible. In the case of a close-coupled tractor-implement unit, there will be a good deal of hose looped about between the tractor and implement, whereas in the case of an implement wherein the fluid motor is relatively remote from the pressure source, the flexible hose may be adequately carried on the tongue of the implement or other supporting structure of the implement.

According to the present invention, it is a principal object to provide improved means for supporting flexible hoses of any length between a tractor and implement or equivalent vehicle train, whereby the hoses may be carried well up out of any area in which they are likely to suffer damage. Another object of the invention relates to the provision of means including a support providing for the proper coiling of the hoses in the event that relatively long hoses are used in a close-coupled tractor-implement unit. In this respect, it is an important object of the invention to provide means whereby the hoses may be coiled on the support without requiring that the hoses be disconnected from either the pressure source or the fluid motor.

Other objects of the invention include the provision of: means providing for the release of the hose-supporting means from the tractor in the event of the application of excessive force to the hoses; means providing for the resilient supporting of the hoses on the support; a carrying means for mounting the support for swinging movement from side to side to accommodate swinging movement of the implement with respect to the tractor; a connection between the support and the hoses so that the support, in the event it becomes disconnected from the tractor, will not become disconnected from the hoses and therefore cannot become lost in the field; and various forms of supports including combinations of closed and open loops in the support for receiving either a single hose or a plurality of hoses.

Further objects and desirable features of the invention will become apparent as the disclosure is more fully made in the following detailed description and accompanying sheets of drawings wherein we have shown, by way of example, several modifications of the invention.

In the drawings:

Figure 1 is a perspective view of the rear portion of a tractor and implement connected thereto, showing the supporting means as carrying a portion of a pair of fluid conduits intermediate a pressure source and a fluid motor;

Figure 2 is a simplified fragmentary plan view of the rear portion of the tractor showing the swingability of the support for the flexible conduit or hose;

Figure 3 is an enlarged rear elevational view of the type of supporting structure shown in Figures 1 and 2, the view being taken directly from the rear and omitting tractor and implement parts;

Figure 4 is a fragmentary view showing the remote end of the supporting arm or member and the manner in which the conduit-engaging member is carried thereon;

Figures 5, 6 and 7 are generally diagrammatic views showing successive steps in coiling the hoses when used with the supporting structure of Figures 1–4;

Figures 8 and 9 are respectively side and end views of a modified form of support in which the loops for both hoses are closed; and Figures 10 and 11 are respectively side and end views of a further modification of support in which both the conduit-engaging loops are open.

The drawings illustrate and the description will pertain to preferred embodiments of the invention. It should be understood, however, that these forms of the invention do not exclude other forms that the invention may take, which forms will undoubtedly suggest themselves to those skilled in the art. Accordingly, the disclosure should be taken as illustrative and not restrictive.

Figure 1 illustrates the use of the invention in connection with a tractor and implement of certain types, but it will be understood that the principles applicable to this illustrative example will be applicable to the use of the invention in connection with other implements.

The tractor chosen for the purpose of illustration may be of any well known type and includes a main body 20 having oppositely extending rear axle housings 21 carried on rear traction wheels 22 (only one of which is shown). The tractor may be equipped with any suitable power control mechanism of the hydraulic type, the interior details of which have not been shown, since such arrangements are well known to those skilled in the art. We have illustrated at 23 a fluid device in the form of a casing which contains a distributing valve, which may also be of any conventional type, and which may in this case be referred to as the source of fluid under pressure.

The tractor includes rearwardly extending drawbar structure, indicated generally by the numeral 24, which provides a support for the forward end of an implement, here shown as including hitch structure 25. The particular implement structure shown is the forward portion of a mower of the type in which the hitch structure 25 is pivoted to the drawbar structure 24 on a vertical axis adjacent the left hand side of the tractor, many examples of which are well known. The right hand side of the hitch structure 25 is releasably secured to the drawbar structure 24 by means of a releasable latch, indicated generally by the numeral 26, and including a release spring 27. The mower is thus connected to the tractor for normal operation therewith until the cutter bar (not shown) strikes an obstruction, in which case the release means 26 functions to release the right hand side of the mower hitch structure 25 from the tractor drawbar structure 24, and permits the mower to swing rearwardly about the vertical axis at the left hand side of the tractor. The example illustrated is but one of many in which the implement is connected to the tractor for movement with respect thereto, which movement may include relative vertical or lateral movement or a combination of the two.

The mower includes rearwardly extending frame structure, indicated generally by the numeral 28, on which is mounted a fluid device such as a fluid motor 29 of the cylinder and piston type. The piston of the motor includes a rod 30 connected at 31 to part of the mower frame 28 and the cylinder is connected at 32 to a movable part of the mower, the part 33 being representative thereof. It will be understood, of course, that the motor may be interchanged end for end and the cylinder connected to an anchor point on the frame and the piston connected to a movable part of the frame.

Other parts of the mower (not shown) are appropriately driven by means of the power take-off shaft of the tractor and suitable power transmitting shafts, not shown here but enclosed within safety shielding, designated generally by the numeral 34.

The fluid motor 29 is preferably of the two-way type; that is to say, the piston may be moved in either direction under fluid pressure; and for this purpose the source of fluid pressure represented by the distributing valve casing 23 is connected to the fluid motor 29 by a pair of flexible fluid-transmitting conduits in the form of hoses 35 and 36. By this means, fluid under pressure applied to one end of the fluid motor 29 will cause relative movement between the mower frame 28 and part 33 in one direction and fluid pressure applied to the other end of the motor will reverse such movement. The illustration in this respect has been rather general, because of the fact that the invention may be applied to several types of arrangements, all of which, in their details, are well known to those skilled in the art.

The invention is here shown in connection with a hydraulic circuit including the two-way fluid motor 29, and consequently there will be the two hoses 35 and 36, inasmuch as this is the most universal application of the type of control system in the field of agricultural implements. It will be understood, of course, that the invention may be readily modified to adapt itself to a hydraulic circuit in which only a one-way motor and a single hose are used.

For the purpose of providing adequate support for the intermediate portions of the hoses 35 and 36; that is, those portions between the fluid pressure source 23 and motor 29, we have provided a supporting member or arm 37 which has one end portion disposed adjacent the tractor unit and its other end portion extending toward but terminating short of the implement unit. That is to say, the second mentioned end is not supported on the implement unit but is free to provide means for supporting the hoses in a manner to be presently described. The supporting member or arm 37 is preferably in the form of a rod-like element and is or includes a portion of stiff but flexible material to provide some degree of resiliency. The general extent of the arm 37 is substantially horizontally and longitudinally between the tractor unit and implement unit, and the end portion thereof adjacent the tractor unit is bent to provide a vertical standard or pivot portion 38. The other end portion extends rearwardly from the main body of the arm in slightly angled relation thereto and the extreme end thereof is bent upwardly to provide a combined stop and connecting element 39. The vertical standard portion 38 is carried by the tractor unit by means of a combined sleeve and bracket 40 (Figures 1 and 3), the bracket being suitably apertured at 41 for easy attachment to the tractor. This standard portion is provided with a plurality of vertically spaced openings 42 (Figure 3) any one of which may receive a pin 43 which cooperates with a washer 44 and the upper portion of the bracket and sleeve 40 to selectively determine the height of the supporting arm 37 with respect to the tractor unit. The mounting of the arm 37 by the means 38—40 provides not only for vertical adjustment of the arm with respect to the tractor, but also for lateral swinging of the arm about the vertical axis of the member 40, as indicated in Figure 2. This feature is important from the standpoint of providing flexibility in tractor and implement arrangements in which the tractor and implement are interconnected for relative swinging movement, whereby the connecting element or supporting end 39 of the arm 37 may follow generally the lateral swinging of the hitch structure between the tractor and implement.

Another part of the supporting means for the conduits or hoses 35 and 36 includes a conduit-supporting member 45, preferably constructed of rod-like material formed to provide the necessary connections between the arm 37 and the hoses or conduits 35 and 36. In the form of the invention shown in Figures 1-7, the member 45 is connected to the arm 37 in a manner to suspend the hoses 35 and 36 therebelow. For this purpose the upper portion of the member 45 is bent or looped to provide a hook or ring portion 46 serving as a connecting eye element cooperable with the connecting element portion 39 of the arm 37. The intermediate portion of the member 45 is looped or bent back upon itself to provide a substantially circular closed loop 47, the interior diameter of which is sufficient to loosely receive the upper hose 35. The portion of the member 45 that provides the closed loop 47 is continued downwardly and is bent or looped upwardly again to provide a second or open loop 48 having an inside diameter sufficient to loosely receive the lower hose or conduit 36. The lower or open loop 48 includes as a continuing integral extension thereof a portion 49 which is substantially spirally related to the looped portion 48 to provide a portion which partially wraps around the lower hose 36 to increase the effectiveness thereof in supporting the hose. The purpose behind the construction in this respect is to provide means for supporting the hoses 35 and 36 with as little friction as possible between the hoses and the member 45, therefore eliminating to the greatest extent possible any damage to the covering of the hoses. The loop or ring 46 by means of which the member 45 is supported on the arm 37 has a sufficiently large inside diameter so that it rides relatively freely on the rear portion 39 of the arm, whereby the member 45, together with the hoses 35 and 36, may move fore and aft on the arm 37 or may twist from side to side with respect thereto, all in a manner minimizing to the greatest extent possible relative movement between the hoses 35 and 36 and the supporting member 45.

The upturned portion 39 on the arm 37 normally serves as a stop or limit means to prevent the member 45 from separating from the arm 37. However, in view of the inherent resiliency in the arm 37 the application of excessive tensional forces to an intermediate portion of either hose 35 or 36 will permit the rear portion of the arm 37 to be deflected downwardly so that the ring portion 46 on the member 45 may slide freely off the end 39. This feature is important in connection with tractor and implement arrangements of the type in which the implement is connected to the tractor for release therefrom in response to excessive draft forces, as in the cases of plows or mowers or similar implements. The cooperative nature of the portion 39 and the member 45 provides releasable means for supporting the conduits, since, upon deflection of the arm 37 to an extent sufficient to dispose the upturned portion 39 horizontally, the member 45 may slip off said upturned portion. The resiliency in the supporting arm 37 also accommodates relative vertical movement between the tractor unit and implement unit as the arrangement travels over uneven terrain and the hoses 35 and 36 may float freely within rather wide limits with respect to the tractor and implement without any undue strain being imposed upon the hoses.

It will be seen from the description thus far that the particular form of the invention herein illustrated and described is scientifically designed to lend itself readily to all characteristics inherent in tractor and implement operation in connection with hydraulic power control and that the features of the invention are directed toward increasing the efficiency of the organization and attributing to the long life of the parts, particularly the flexible conduits or hoses.

In the ordinary case of a tractor equipped with power control and including a pressure source comparable to the pressure source 23 herein indicated, it is common practice to disconnect the fluid motor from one implement, leaving it connected to the tractor by means of the hoses 35 and 36, and to use the same motor in connection with a different implement drawn by the tractor. In many cases it occurs that the differences between implements are emphasized mainly in the position of the motor with respect to the tractor; that is, in one of them the motor may be located on an implement part relatively close to the pressure source 23 and in other implements the motor 29 may be located at a point relatively remote from the pressure source 23. In order that the user of the tractor and implement need not provide himself with several lengths of hose for accommodating these changes in distance between the pressure source and fluid motor, it is the practice to standardize on the few universal hoses that may be used to meet the ordinary requirements. It will be seen that in the use of a tractor with a close-coupled implement there will be considerable excess hose, as distinguished from the case of a tractor and a remotely connected implement. If these excess portions of the hoses were allowed to drag on the ground or merely to trail over the implement or tractor part, they would be subject to considerable damage. On the other hand, the operator may find it expedient to tie these excess portions to a part of the implement or tractor. It has been found, however, that in many cases the temporary supporting of the hoses is done in such manner as to increase the possibility of damage to the hoses, inasmuch as there are rigid requirements as to the coiling characteristics of the hoses. According to the present invention the supporting means for the hoses includes provision for accommodating the hoses in coiled form. Figures 5, 6 and 7 illustrates the manner of coiling both hoses in conjunction with the hose carrying member 45.

According to this form of the invention the member 45 is provided with the closed loop 47 and the open loop 48. The member 45 is installed on the hose 35 by first disconnecting the hose 35 and then threading the same through the closed loop 47. The fact that the loop 47 is closed results in the retention of the member 45 on the hose 35, so that it cannot be lost from the hose during field operation. When it is desired to coil the hoses 35 and 36 and change the position thereof from those indicated in Figure 1 to those indicated in Figure 7, the first step includes the removal of the member 45 from the member 37 (Figure 5), together with removal of the lower hose 36 from the open loop 48. A single turn is accomplished in the upper hose 35, at the same time rotating the member 45 substantially about a vertical axis through a range on the order of 180 degrees, after which the member 45 is reconnected to the member 37 (Figure 6), thus establishing the coil C in the upper hose 35. A single turn is then made in the lower hose 36, as at C¹ in Figure 7, and the coil C¹ is hooked back into the open loop 48. This manner of coiling the hoses 35 and 36 may be easily followed without disconnecting either hose from either the motor 29 or pressure source 23. This form of the invention is particularly adaptable to situations in which the hose manufacturer places no limitations upon whether or not the hoses may be coiled.

Hoses of certain manufactures do not possess coiling characteristics and the user is required to use the hoses without coils therein. In cases of this kind we have provided a modified form of supporting member, designated generally by the numeral 55 in Figures 8 and 9. With this type of member 55, it is impossible to coil the hoses without disconnecting at least one of them and threading the same back through the loop in which it is carried. This supporting member includes an upper ring-like portion 56 by means of which the member may be carried on the arm 37. The member also includes a first closed loop 57 and a second closed loop 58. The manner of forming the loop and the ring in the member 55 will be obvious from the drawings. The lower loop 58 includes a continuing spiral extension portion 59 which, like the portion 49 on the member 45 previously described, accomplishes a partial wrap on the lower hose to increase the supporting effectiveness thereof. The increase in the effectiveness of the upper loop 57 in supporting the hose is accomplished by virtue of the fact that the stock from which the member 55 is formed is bent back upon itself to provide the loop 57. The operation of a tractor implement organization using the member 55 instead of the member 45 follows the procedure outlined above, with the exception of the manner of coiling the hoses. With this exception, the other characteristics of the invention are present.

As a still further modified form of the invention, we have shown in Figures 10 and 11 a third type of supporting member, indicated generally by the numeral 65, and having a ring or loop portion 66, an upper open loop 67 and a lower open loop 68. The ring or loop 66 provides means for carrying the member 65 on the supporting arm 37. The lower loop 68, like the open loop 48 previously described, includes a continuing spiral extension portion 69 for accomplishing a partial wrap on the hose to increase the supporting effectiveness thereof. The upper loop 67 includes a similar portion 70. In the use of the member 65, the coiling of the hoses 35 and 36 in an easy matter. However, since neither loop 67 nor 68 is closed there is no means effective to guarantee against loss of the member 65 from the hoses 35 and 36 in the event that the ring portion 66 becomes disconnected from the connecting element 39 on the arm 37 unbeknownst to the operator.

It will be seen from the foregoing description that the members 45, 55 and 65 are interchangeable and have many structural and functional characteristics that are common. In the disclosure of these forms of the invention the members 55 and 65 have not been illustrated in connection with the supporting arm 37, but it will be obvious that they may be so used and the disclosure should be taken as including all possible uses of these members with the supporting arm 37 or its equivalent to the extent that the same is illustrated in connection with the supporting arm 37 and member 45.

In looking at the invention generally, together with all its forms, it will be seen that the improved supporting means includes the desirable characteristics of flexible supporting of the hoses in a manner to accommodate all possible variations in movements thereof between the tractor and implement and relative movement between the tractor and implement themselves. In the form including the members 45 and 55, provision is made to guarantee against accidental loss of the members from the hoses. In the cases of the members 45 and 55, provision is made for adequately coiling the hoses to accommodate excessive lengths of the hoses when the hydraulic control circuit is utilized with a close-coupled implement. In all forms of the invention, the arm 37 is flexibly mounted on the tractor not only for movement vertically and laterally during operation but also for adjustable movement vertically. In this respect it should be noted that the supporting arm 37 may be alternatively carried on the implement; however, since the source of fluid pressure is on the tractor and since common practice is to maintain the connection between the tractor and fluid motor, it is more desirable to have the supporting arm carried by the tractor. Various other modifications of the invention will readily suggest themselves to those skilled in the art and it is therefore not desired that the invention be limited by the precise structural details shown.

What we claim is:

1. In a tractor-implement arrangement including a tractor unit and an implement unit interconnected for travel together by a propelling force developed by the tractor and wherein each unit includes a fluid device and the devices are spaced apart generally along the line of propelling force and are interconnected by a flexible fluid conduit of greater length than the distance between the devices so as to be capable of having a loop therein intermediate the devices, the improvement comprising: a supporting member having a mounting portion for the mounting thereof on one unit adjacent the fluid device of that unit and further having an elongated arm portion joined to the upright portion to project normally horizontally from that one unit toward the other unit and having a terminal end intermediate the devices and spaced from a straight line drawn from one device to the other, said member having one of its portions formed of stiff but resilient material so that the arm portion is capable of being forcibly deflected downwardly from its aforesaid normal position; a conduit carrier having an eye through which said arm portion slidably passes, said carrier further including a conduit-engaging element for receiving and supporting an intermediate portion of the conduit that is looped away from the straight line between the devices; and releasable means cooperative between the terminal end portion of the arm and the conduit carrier for normally retaining the conduit carrier against sliding off said arm portion, said means being constructed and arranged to effect release of the conduit carrier endwise off said arm portion upon downward deflection of said arm portion by excessive force tending to move said looped intermediate portion of the conduit toward the aforesaid straight line.

2. The invention defined in claim 1, further characterized in that: the releasable means comprises an integral part at the terminal end of the arm portion bent up from the normal horizontal extent of said arm portion to retain the eye of the conduit carrier, said bent-up part being displaceable upon downward deflection of the arm portion for releasing said eye.

3. The invention defined in claim 1, further characterized in that: the conduit carrier is in the form of a rod having a loop providing the aforesaid eye and a second loop providing the aforesaid conduit-engaging element.

4. The invention defined in claim 1, applied to a tractor-implement arrangement that includes a pair of two-way fluid devices interconnected by a pair of flexible fluid conduits, further characterized in that: the conduit carrier has a first loop providing the aforesaid eye, a second loop providing for engaging and supporting one conduit and an integral third loop for engaging and supporting the other conduit.

5. The invention defined in claim 1, applied to a tractor-implement arrangement that includes a pair of two-way fluid devices interconnected by a pair of flexible fluid conduits, further characterized in that: the conduit carrier includes a pair of conduit-engaging portions, one for each conduit, one of said conduit-engaging portions comprising a closed loop for receiving one conduit, and the other comprising an open loop for receiving the ther conduit.

6. The invention defined in claim 1, applied to a tractor-implement arrangement that includes a pair of two-way fluid devices interconnected by a pair of flexible fluid conduits, further characterized in that: the conduit carrier includes a pair of separate conduit-engaging portions, one for each conduit, each of said conduit-engaging portions comprising a closed loop into which the respective conduit fits.

7. The invention defined in claim 1, applied to a tractor-implement arrangement that includes a pair of two-way fluid devices interconnected by a pair of flexible fluid conduits, further characterized in that: the conduit carrier includes a pair of separate conduit-engaging portions, one for each conduit, each of said conduit-engaging portions comprising an open loop into which the respective conduit fits.

8. The invention defined in claim 1, further characterized in that: the conduit carrier is in the form of a depending rod-like element having a first looped portion providing an eye engaging the elongated arm portion, and further having a second looped portion constituting the conduit-engaging portion, said second looped portion including at least a partial additional loop-forming turn to increase its supporting effectiveness on the conduit.

9. The invention defined in claim 1, applied to a tractor-implement arrangement that includes a pair of two-way fluid devices interconnected by a pair of flexible fluid conduits, further characterized in that: the conduit carrier includes a pair of separate conduit-engaging portions, one for each conduit, one of said conduit-engaging portions comprising a closed loop for receiving one conduit, and the other comprising an open loop for receiving the other conduit, said open loop including a continuing integral extension that wraps partially about the conduit it carries.

10. The invention defined in claim 1, applied to a tractor-implement arrangement that includes a pair of two-way fluid devices interconnected by a pair of flexible fluid conduits, further characterized in that: that conduit carrier includes a pair of separate conduit-engaging portions, one for each conduit, each of said conduit-engaging portions comprising an open loop into which the respective conduit fits, each of said loops including a continuing integral extension that wraps partially about the conduit it carries.

11. The invention defined in claim 1, further characterized in that: the conduit-engaging element is so constructed and arranged as to be releasable from the conduit without disconnection of the conduit from either fluid device.

12. In a tractor-implement arrangement including a tractor unit and an implement unit interconnected for travel together by a propelling force developed by the tractor and wherein each unit includes a two-way fluid device and the devices are spaced apart generally along the line of propelling force and are interconnected by a pair of flexible fluid conduits of greater length than the distance between the devices so that said conduits may have loops therein intermediate the devices, the improvement comprising: a supporting member including means for the mounting thereof on one unit and having a support portion adapted to project to a terminal end between the units and above the conduits; and a conduit carrier depending from said support portion and having an element detachably receiving said support portion so as to resist twisting of the carrier completely about a vertical axis relative to said support portion, said carrier including a pair of spaced loops fixed relative to each other and relative to said element and adapted respectively to receive portions of the conduits directed upwardly in crossed loop form, so that the aforesaid resistance of the carrier to twisting relative to said support portion serves to retain the looped form of the conduits except when the carrier is detached from the said support portion.

13. The invention defined in claim 12, further characterized in that: one of the loops of the carrier is closed so as to have one conduit threaded therethrough, and the other loop of the carrier is open so that the other conduit may be hooked thereover.

14. The invention defined in claim 12, further characterized in that: both loops of the carrier are closed so as to have the conduits respectively threaded therethrough.

15. The invention defined in claim 12, further characterized in that: both loops of the carrier are open so that the conduits may be hooked respectively thereover.

WILLIAM A. YOUNG.
DESLE O. H. MILLER.

REFERENCES CITED

The following references are of record in the file of this patent:

UNITED STATES PATENTS

| Number | Name | Date |
|---|---|---|
| 934,808 | Hiss | Sept. 21, 1909 |
| 1,444,315 | Hirschler | Feb. 6, 1923 |
| 1,465,334 | Banks et al. | Aug. 21, 1923 |
| 1,586,465 | Perdue | May 25, 1926 |
| 1,673,704 | Palmer et al. | June 12, 1928 |
| 2,095,185 | Fish | Oct. 5, 1937 |
| 2,319,486 | Austin | May 18, 1943 |